(12) United States Patent
Bai

(10) Patent No.: US 6,735,395 B1
(45) Date of Patent: May 11, 2004

(54) WDM COMMUNICATION SYSTEM UTILIZING WDM OPTICAL SOURCES WITH STABILIZED WAVELENGTHS AND LIGHT INTENSITY AND METHOD FOR STABILIZATION THEREOF

(75) Inventor: Yu Sheng Bai, Redwood City, CA (US)

(73) Assignee: FutureWei Technologies, Inc., Plano, TX (US)

( * ) Notice: Subject to any disclaimer, the term of this patent is extended or adjusted under 35 U.S.C. 154(b) by 472 days.

(21) Appl. No.: 09/675,731

(22) Filed: Sep. 29, 2000

(51) Int. Cl.[7] ............................................... H04J 14/02
(52) U.S. Cl. ........................... 398/95; 398/94; 398/196; 398/197; 372/32; 372/31
(58) Field of Search ..................... 398/95, 93, 82, 398/79, 195–196, 94, 197; 372/31–32

(56) References Cited

U.S. PATENT DOCUMENTS

| | | | |
|---|---|---|---|
| 5,589,970 A | * 12/1996 | Lyu et al. ..................... 398/95 |
| 5,696,859 A | * 12/1997 | Onaka et al. .................. 385/24 |
| 5,798,859 A | 8/1998 | Colbourne et al. ......... 359/247 |
| 5,825,792 A | 10/1998 | Villeneuve et al. ........... 372/32 |
| 5,894,362 A | * 4/1999 | Onaka et al. .................. 398/95 |
| 6,005,995 A | 12/1999 | Chen et al. .................... 385/24 |
| 6,469,812 B2 | * 10/2002 | McKiel, Jr. ..................... 398/5 |
| 2002/0048063 A1 | * 4/2002 | Jung et al. .................. 359/124 |

* cited by examiner

Primary Examiner—Kinfe-Michael Negash
(74) Attorney, Agent, or Firm—Gary L. Bush; Andrews Kurth LLP

(57) ABSTRACT

A multichannel WDM transmission system incorporates a plurality of WDM optical sources with stabilized wavelengths and light intensity. Efficient stabilization of these characteristics is achieved by modulation of WDM sources by distinguishing low frequency electrical signals in a range between 1 and 4 kHz and modulation depth in a range between 1% and 5% that are used as WDM source identifiers. After the modulated outputs of the WDM sources are multiplexed and filtered, a Fourier transform of total light intensity may be obtained. Digital feedbacks provide stabilization of both the wavelength and light intensity of each WDM optical source.

24 Claims, 3 Drawing Sheets

WDM COMMUNICATION SYSTEM UTILIZING WDM OPTICAL SOURCES WITH STABILIZED WAVELENGTHS AND LIGHT INTENSITY AND METHOD FOR STABILIZATION THEREOF

FIELD OF THE INVENTION

The present invention relates to wavelength division multiplexing (WDM) multichannel communication systems propagating WDM optical signal encoded with a large amount of data via an optical fiber. More particularly, the present invention relates to WDM communication systems utilizing a plurality of WDM optical sources having stabilized wavelengths and light intensity characteristics.

BACKGROUND OF THE INVENTION

The performance of multichannel WDM optical communication systems requires the integrity of signals produced by WDM optical sources. For contemporary WDM optical communication systems the wavelength and power of each WDM optical source have to remain stable for at least 10 years. Since aging of components and environmental variation cause the wavelength and power drifts, an active stabilization of wavelength and power of each WDM source has to be provided.

A conventional method of control and stabilization of the optical power of each channel of WDM optical transmission system is disclosed, for example by Onaka et al (the U.S. Pat. No. 5,894,362). FIG. 1 of accompanying drawings is a diagram illustrating Onaka et al teaching. WDM multichannel communication system 100 comprises a plurality of diode lasers 101 connected to a corresponding plurality of data modulators 102. A WDM multiplexer 103 combines optical outputs of the data modulators 102. A small portion of the multiplexed optical power is tapped by coupler 104 and launched through a transmission line 105 to a wavelength selective device 106. The wavelength selective device may be a spectrum analyzer having a resolution higher than the WDM channels spacing. The spectrum of the sample signal is then analyzed by a microprocessor 107. The output signals of the microprocessor is used to control output power of the diode lasers 101.

Theoretically this method could also be used for the wavelength stabilization of the high performance WDM communication systems. However it is very difficult to implement it in practice since to stabilize the center wavelength of each laser to the accuracy of the order of 0.01 nm, the spectrum analyzer must have very high spectral resolution.

A conventional method of wavelength stabilization is illustrated by diagram shown in FIG. 2. Each optical source (usually a semiconductor diode laser) 201 of a WDM communication system generates an optical signal. A small portion of the output from each optical source 201 is diverted by an external tap coupler 202 and directed to a wavelength reference device 203, commonly referred to as "wavelength locker". The error signal generated by the wavelength locker is then fed back to a laser temperature control unit 204 (as described in U.S. Pat. No. 5,798,859; No. 5,825,792; and No. 6,005,995.) The laser temperature control unit 204 shifts the laser wavelength to the reference wavelength. Some commercially available diode lasers have built-in wavelength lockers (U.S. Pat. No. 5,825,792). More frequently, however, external wavelength lockers are used for wavelength stabilization (U.S. Pat. Nos. 5,798,859 and 6,005,995).

Customarily each WDM source has its own wavelength locker. As the number of WDM channels increases, the number of required wavelength lockers increases proportionally. The cost of an external wavelength locker is comparable or even higher than the cost of a WDM source. In addition, the spectrum analyzer used for channel power monitoring is extremely expensive. As a result, the stabilization devices represent a significant portion of the total cost of the multichannel WDM system.

SUMMARY OF THE INVENTION

The present invention provides a cost effective, integrated solution for the wavelength and power stabilization of all channels in a WDM communication system, where a low frequency, small depth modulation is superimposed on the light intensity of each individual WDM channel before the corresponding channel is multiplexed by the WDM muliplexer. After WDM channels are multiplexed, modulations having a specific frequency for each channel, serve as identifiers for the corresponding channels. By applying a Fourier transform on total light intensity of the combined optical signal, the characteristic frequency components, and related information, of each channel is extracted.

According to the present invention a WDM communication system for propagating a plurality of optical signals produced by a corresponding plurality of WDM optical sources via an optical fiber comprises a transmission system for generating and transmitting optical signals. The optical signals are modulated with distinguishing low frequency electrical signals having small modulation depth and used as identifiers for each WDM optical source. The modulated optical signals are mixed by the WDM multiplexer. To detect a small portion (about 1%) of WDM optical signal and obtain first and second electrical signals carrying information on light intensity and wavelength of each WDM optical source, a detection system is coupled to the transmission system. A control system is inserted between the transmission system and the detection system for analyzing the first and second electrical signals by Fourier transform and obtaining information on wavelength and light intensity for each WDM optical source. Wavelength and light intensity are adjusted accordingly.

According to one aspect of the present invention the transmission system comprises a plurality of data modulators that are connected respectively to the plurality of WDM optical sources for modulating the optical signal in each WDM channel by an electrical signal of low frequency and small depth of modulation. A low frequency generator is coupled to each data modulator for generating a distinguishing electrical signal of low frequency and small modulation depth. Each data modulator comprises high frequency input for transmitting the optical signal of the WDM optical source and low frequency input for applying the distinguishing electrical signal. A plurality of variable optical attenuators is coupled to a respective plurality of data modulators for setting a predetermined optical power for each WDM optical source. A WDM multiplexer combines output signals of the variable optical attenuators into a WDM optical signal. About 1% of WDM optical signal is diverted by an external tap coupler. A splitter divides a diverted portion of WDM optical signal into first and second sample signals for directing them into respective first and second transmission paths. A first detector is placed within the first transmission path for detecting and converting this first sample signal into a first electrical signal. A wavelength locker and a second detector are placed within the second transmission path for providing wavelength selectivity of the second sample signal and converting it into a second electrical signal. A microprocessor is coupled to the output of the first and second detectors for analyzing first and second electrical signals by transforming them into Fourier components corresponding respectively to intensity and wavelengths of the WDM optical sources. Feedback connectors are coupled between the microprocessor and WDM optical sources for providing digital feedback on wavelength characteristics of WDM optical sources, and between the microprocessor and variable optical attenuators for providing digital feedback on light intensity of WDM optical sources.

According to another aspect of the present invention, a plurality of $LiNbO_3$ modulators are utilized as data modulators. A bias control unit coupled to each $LiNbO_3$ modulator generates a distinguishing electrical signal of low frequency and small modulation depth. Each $LiNbO_3$ modulator comprises high frequency input for transmitting the optical signal of the WDM optical source and low frequency input for applying the distinguishing electrical signal of low frequency and small modulation depth.

According to yet another aspect of the present invention, directly modulated diode lasers are utilized as both WDM optical sources and data modulators. Each directly modulated diode laser is coupled to a generator of low frequency electrical signal. The generator of low frequency electrical signals generates a distinguishing electrical signal of low frequency and small modulation depth that is applied to the low frequency input of a corresponding directly modulated diode laser. Each distinguishing low frequency electrical signal serves as an identifier for a respective directly modulated diode laser for the process of identification and adjusting wavelength and light intensity for each directly modulated diode laser.

According to the method for stabilization of light intensity and wavelength of WDM optical sources of multichannel WDM communication system, the WDM optical sources are modulated by distinguishing electrical signals of low frequency and small modulation depth for obtaining a unique optical output from each WDM optical source. A predetermined optical power is set for WDM optical sources by attenuating each output of the WDM optical sources by variable optical attenuators. The modulated outputs of the WDM optical sources are combined by a WDM multiplexer for obtaining a WDM optical signal. A sample signal, being a small portion of the WDM optical signal, is diverted and divided into two approximately equal portions that are transmitted via two respective transmission paths. The first portion is detected and converted into a first electrical signal. For the second portion, wavelength selectivity is provided by a wavelength locker, and the second portion is converted into a second electrical signal. The first and second signals are analyzed by a microprocessor The microprocessor is equipped with analog-to-digital converters and is connected to outputs of the first and second detectors for transforming them into Fourier components corresponding respectively to wavelengths and light intensity of the WDM optical sources. The microprocessor then analyzes the relative amplitude of each Fourier component and provides digital feedback to set correct wavelength and light intensity of each WDM source respectively. Identification of light intensity and wavelength of each WDM optical source is provided by utilizing the unique optical output for each WDM optical source. Digital feedback is fed to variable optical attenuators and WDM optical sources for stabilization intensities and wavelengths thereof.

BRIEF DESCRIPTION OF DRAWINGS

The above-mentioned features and advantages of the present invention will be described by way of example with references to the accompanying drawings in which.

DETAILED DESCRIPTION OF THE INVENTION

Figure 3:
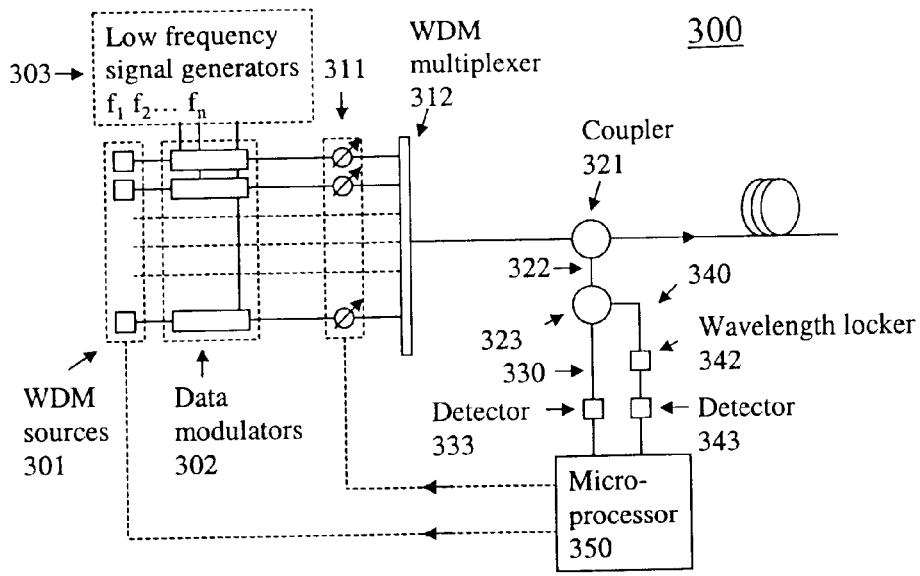
FIG. 3 shows a schematic view of a WDM multichannel communication system that incorporates a plurality of WDM optical sources with stabilized wavelength and light intensity characteristic according to the present invention.

Referring to FIG. 3 of the accompanying drawings, WDM multichannel communication system comprises a plurality of WDM optical sources 301 that are connected to a corresponding plurality of data modulators 302 for generating optical signals at different wavelengths ($\lambda_1, \lambda_2, \ldots \lambda_n$), modulating and transmitting them via respective communication channels (1, 2, ... n). Each of the data modulators 302 comprises a high frequency input for transmitting optical signal and a low frequency input for biasing the subject modulator. Generators of low frequency signals 303 produce a plurality of different low frequency electrical signals that are applied respectively to low frequency inputs ($f_1, f_2, \ldots f_n$) of the data modulators 302. A plurality of optical signals from WDM optical sources are modulated by corresponding plurality of electrical signals of low frequency and small modulation depth. The modulated optical signals are passed through variable optical attenuators 311, which set the optical power of each WDM channel to certain predetermined values. A WDM multiplexer 312 combines the optical signals into a WDM optical signal.

Preferably, the modulation frequencies ($f_1, f_2, \ldots f_n$) are in a range of about 1 kHz–4 kHz. To avoid interference from the transmitted signals, the modulation frequencies should be lower than the lowest frequency components of the data modulation. The depth of modulation of optical signals is approximately the same for all channels and is in a range of about 1% to 5% of the average power of the optical signals. The modulation frequencies ($f_1, f_2, \ldots f_n$) are arranged in the same sequence as the wavelengths ($\lambda_1, \lambda_2, \ldots \lambda_n$). The spacing between the modulation frequencies, i.e., the separation between the adjacent frequencies should be large enough to be resolved by the Fourier transform. On the other hand, the spacing should be small enough so that identification frequencies for all the WDM channels, typically ~100 channels, can fit in the frequency range of 1–4 kHz. The resolution of the Fourier transform is given by the inverse of the sampling time. For example, a sampling time interval of 1 second gives a resolution of 1 HZ, which can resolve the frequencies separated by 10 Hz. With a 10 Hz spacing, 100 channel identifiers can be put in the frequency range of 1 kHz–2 kHz.

An external tap coupler 321 diverts a small portion of the multiplexed optical signal via transmission path 322. This small portion of the multiplexed optical signal is a sample signal that carries information on wavelengths and power intensity of WDM optical sources 301. The sample signal is divided in first and second optical signals by a splitter 323 and transmitted via transmission paths 330 and 340 respectively. The optical signals are then converted to electrical signals by respective low-speed detectors 333 and 343 and analyzed by a microprocessor 350.

For WDM power equalization and stabilization, the first sample signal propagating through the transmission path 330 is analyzed. The signal is detected by detector 333, and then Fourier transformed by microprocessor 350 to obtain power of each of WDM optical sources 301. Each of the variable optical attenuators 311 is adjusted by a digital feedback.

For characterization of power of an individual channel i, one considers a modulation depth m, which is the same for all communication channels. The optical signal power of an i-th individual channel may be described as:

$$P_i(t)=P_{i0}*[1+m\cos(2\pi f_i t+\phi_i)],$$

where $P_{i0}$ is the optical signal power in the absence of low frequency modulation, m is the modulation depth, $f_i$ is the modulation frequency, and $\phi_i$ is the phase of the low frequency signal. After optical signals of WDM optical sources 301 are modulated by the data modulators 302, attenuated by the variable attenuators 311, and combined by the WDM multiplexer 312, the total optical power of the WDM optical signal is a linear superposition of individual communication channels:

$$P_{total}(t)=\Sigma P_{i0}*[1+m\cos(2\pi f_i t+\phi_i)]$$

The output electrical signal from the detector 333 is presented as:

$$V(t)=\Sigma V_{i0}*[1+m\cos(2\pi f_i t+\phi_i)],$$

where V(t) is the electrical voltage generated by the detector 333 corresponding to the total optical power $P_{total}(t)$, and $V_{i0}$ corresponds to the optical power of the individual channel $P_{i0}$.

The electrical signal is proportional only to the average optical power because the low-speed detector does not respond to high frequency data modulation:

$$V(t)=\eta_1<P_{total}>=\Sigma\eta_1<P_{i0}>*[1+m\cos(2\pi f_i t+\phi_i)],$$

where $\eta_1$ is a constant depending on the coupling coefficients of the coupler 321 and the splitter 323, and the optical-to-electrical conversion efficiency of the detector 333. After the Fourier transform, the amplitude of the Fourier component at $f_i$ is given by:

$$|F_1(f_i)|=V_{i0}m/2=\eta_1<P_{i0}>m/2.$$

The f=0 Fourier component gives the total average power of all channels.

$$|F_1(0)|=\Sigma V_{i0}=\eta_1<P_{total}>.$$

Therefore the average power of an i-th individual channel is directly related to the Fourier component at $f_i$, $$<P_{i0}>=<P_{total}>2|F_1(f_i)|/(m|F_1(0)|).$$

Figure 1:
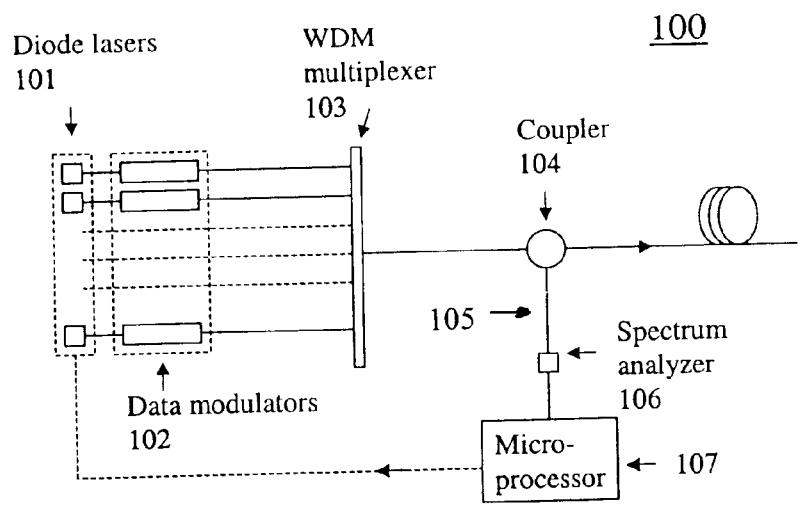
FIG. 1 shows a schematic view of a WDM multichannel communication system with conventional light intensity stabilization of each channel.
Figure 2:
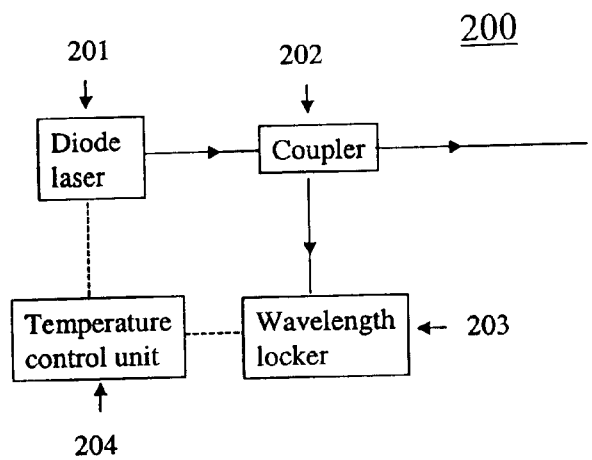
FIG. 2 shows a schematic view of a fragment of a WDM multichannel communication system with conventional wavelength stabilization of each WDM source.

The microprocessor 350 compares this power with a pre-set value, and changes the setting on the corresponding variable optical attenuators 311. Alternatively, the microprocessor 350 can change the setting of the driving current of the corresponding WDM source in 301 to set the correct power for each channel, the same as that described in the FIG. 1. This process is continuously repeated for every communication channel, so that the average power of every channel can be stabilized to the pre-set value.

For wavelength stabilization of WDM optical sources 301, the second sample signal propagated through the transmission path 340 is analyzed. Transmission path 340 comprises wavelength locker 342. A wavelength locker of a Fabry-Perot type is a thermally stable etalon that provides a wavelength reference to each wavelength on the ITU grid; therefore one wavelength locker can be used for all WDM communication channels.

As indicated earlier, the total optical power after WDM multiplexer 312 is:

$$P_{total}(t)=\Sigma P_{i0}*[1+m\cos(2\pi f_i t+\phi_i)],$$

and the output electrical signal from the detector 343 is:

$$U(t)=\Sigma U_{i0}*[1+m\cos(2\pi f_i t+\phi_i)],$$

where U(t) is the electrical voltage generated by the detector 332 corresponding to the total optical power $P_{total}(t)$, and $U_{i0}$ corresponds to the optical power of the individual channel $P_{i0}$. The transmission of the wavelength locker is wavelength dependent, so the output electrical signal is generally related to the optical power by:

$$U(t)=\Sigma\eta_{i2}(\lambda_i)<P_{i0}>*[1+m\cos(2\pi f_i t+\phi_i)],$$

where $\eta_{i2}$ is proportional to the coupling coefficients of the coupler 321 and the splitter 323, the transmission coefficient of wavelength locker 343, which is a function of the i-th wavelength in WDM optical sources 301, and the optical-to-electrical conversion coefficient of the detector 343. The Fourier component at $f_i$ that identifies i-th channel is given by:

$$|F_2(f_i)|=U_{i0}m/2=\eta_{i2}(\lambda_i)<P_{i0}>m/2.$$

When the center wavelength of the channel is locked to an ITU grid, $\eta_{i2}(\lambda_i)$ is a pre-set constant, $$\eta_{i2}(\lambda_{i0})=\eta_2,$$

which is the same for all channels. As a result, at the reference wavelength, the ratio:

$$\eta_2/\eta_1=|F_2(f_i)|/|F_1(f_i)|=\text{Constant}$$

By comparing the ratio between the Fourier components $|F_2(f_i)|/|F_1(f_i)|$ with a pre-set value, the microprocessor 350 can re-set the temperature of the corresponding WDM source, and keep its center wavelength from deviating from the ITU grid. This process is continuously repeated for every communication channel, so that the center wavelength of every channel can be stabilized corresponding to ITU grid.

Figure 4:
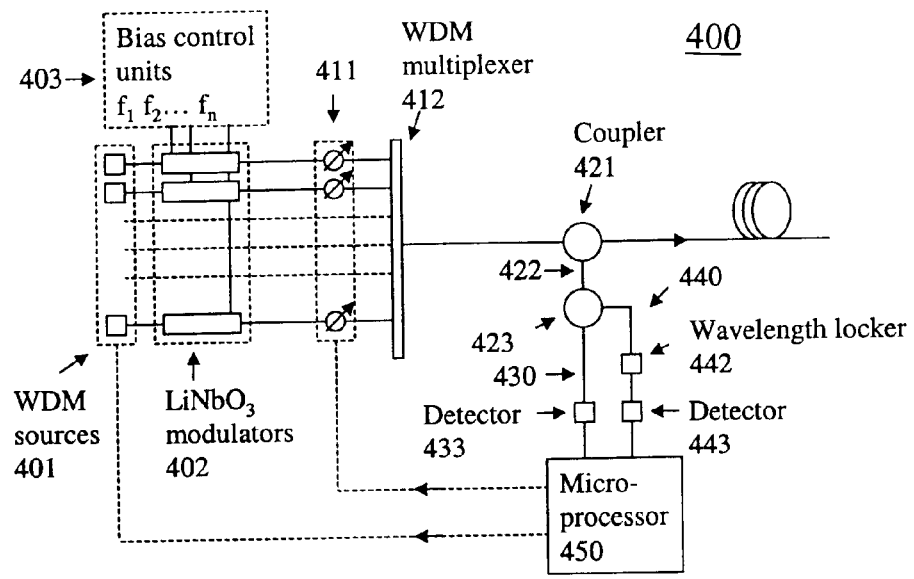
FIG. 4 shows a schematic view of a WDM multichannel communication system that incorporates the plurality of WDM optical sources and $LiNbO_3$ data modulators with stabilized wavelength and light intensity characteristic according to the present invention.

Referring to FIG. 4 of the accompanying drawings, a WDM multichannel communication system 400 utilizes WDM optical sources, for which light intensities and wavelengths are stabilized. A plurality of WDM laser sources 401 is connected to a corresponding plurality of LiNbO$_3$ data modulators 402 for modulating the optical signals generated by WDM laser sources 401 at different wavelengths ($\lambda_1, \lambda_2, \ldots \lambda_n$), modulating them and transmitting via respective communication channels (1, 2, . . . n). Each of the LiNbO$_3$ data modulators 402 may comprise a high frequency input for transmitting optical signals generated by one of WDM sources 401, and a low frequency input for biasing this data modulator. Depending on manufacturing design of $LiNbO_3$ data modulators, low and high frequency inputs may be combined into one. Utilization of $LiNbO_3$ data modulators in the WDM communication system may be particularly beneficial due to properties of such data modulators. It is known in the art that the DC bias levels of these modulators tend to drift over time. Customarily active stabilization of a drifting DC bias voltage is provided by applying a low frequency modulation to a transmitted signal for obtaining an error signal that is fed back to the bias voltage for stabilization thereof. Bias control units 403 provide a plurality of distinguished low frequency electrical signals having frequencies ($f_1, f_2, \ldots f_n$) in a range of about 1 kHz to 4 kHz. Each of the $LiNbO_3$ data modulators 402 is biased by a respective signal provided by a bias control unit in 403. Optical signals generated by WDM optical sources 401 and modulated by $LiNbO_3$ data modulators 402, are attenuated by variable optical attenuators 411. The optical signals are then combined by WDM multiplexer 412 into a WDM optical signal. An external tap coupler 421 diverts a small portion of the WDM optical signal into a transmission path 422. This portion is divided by splitter 423 into a first and a second sample signals that are guided respectively via transmission paths 430 and 440. The first and second optical signals are converted into first and second electrical signals by detectors 433 and 443 respectively. The transmission path 440 comprises a wavelength locker 442 for providing wavelength selectivity of the second sample signal and keeping the center wavelength of the spectrum of this signal from deviating from the ITU grid.

The first and second electrical signals are analyzed by microprocessor 450 to obtain the power value of each WDM optical source 401. Utilizing digital feed back, the adjustment of input signals for variable optical attenuators 411 for power equalization and stabilization of light intensity of WDM optical sources is provided.

For wavelength stabilization, the second electrical signal is Fourier transformed by microprocessor 450 to obtain a wavelength characteristic of each WDM optical source 401. Utilizing digital feedback the adjustment of the temperature of the corresponding WDM optical source in 401 is provided for wavelength stabilization.

Figure 5:
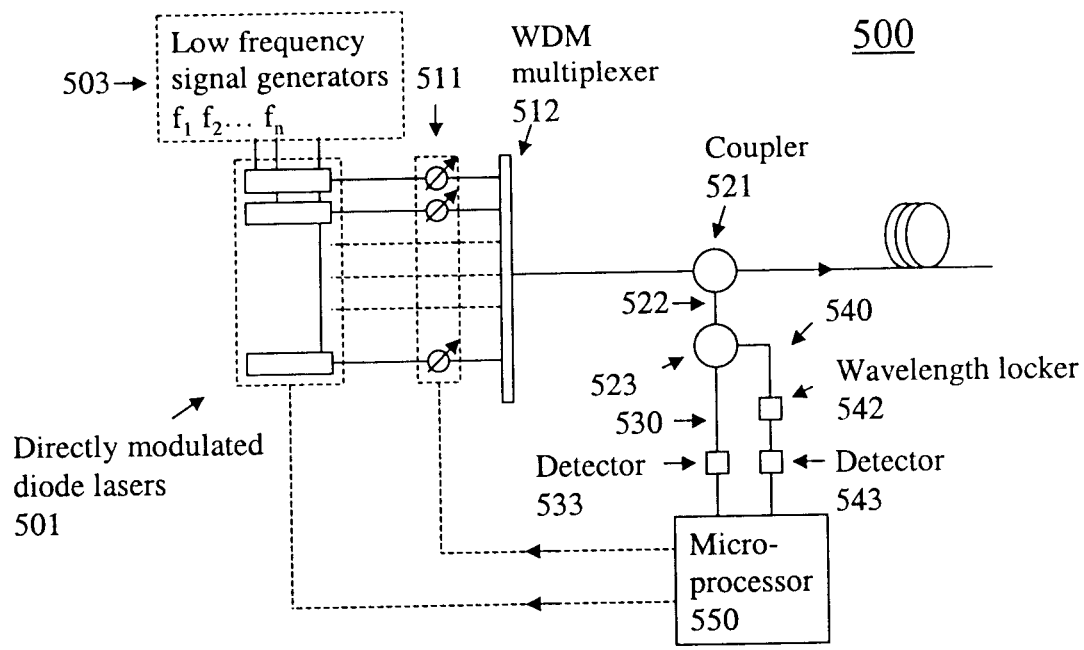
FIG. 5 shows a partial schematic view of a WDM multichannel communication system that incorporates the plurality of directly modulated diode lasers with stabilized wavelength and light intensity characteristic according to the present invention.

A WDM multichannel communication system 500 shown in FIG. 5 of accompanying drawings utilizes directly modulated lasers. In this system, the functions of WDM optical sources 301 and data modulators 302 of the WDM system 300 (shown in FIG. 3) are combined in directly modulated lasers 501. The active stabilization of light intensities and wavelengths of directly modulated lasers 501 in system 500 are achieved similar to those in the WDM system 300 (shown in FIG. 3). However in the WDM communication system 500, a plurality of distinguishing low frequency signals in a range between 1 kHz and 4 kHz with small modulation depth generated by a generator of low frequency signals 503 is applied to a corresponding plurality of directly modulated diode lasers 501. Modulated optical signals are attenuated by variable optical attenuators 511 and mixed by a WDM multiplexer 512 into a WDM optical signal. A small portion of the WDM optical signal is sampled out by an external tap coupler 521 and diverted into a transmission path 522. Splitter 523 divides the diverted portion of the WDM optical signal into first and second sample signals which are transmitted via transmission paths 530 and 540 respectively. The first optical sample signal is converted to a first electrical signal by a low-speed detector 533 and Fourier transformed by a microprocessor 550 to obtain power value of each directly modulated diode laser 501. Utilizing digital feed back, each of variable attenuators 511 is adjusted for power stabilization. The second optical sample signal is transmitted via a wavelength locker 542 and converted to a second electrical signal by the detector 543 for selecting a wavelength of certain value. The second electrical signal is Fourier transformed by a microprocessor 550 to obtain the wavelength characterization of each WDM optical source. Utilizing digital feed back, the temperature of each laser in 501 is adjusted for wavelength stabilization.

What is claimed is:

1. A WDM communication system for propagating a plurality of optical signals produced by a corresponding plurality of WDM optical sources via an optical fiber comprising:

a transmission system for generating and transmitting said optical signals, each said optical signal modulated by a distinguishing electrical signal of low frequency and small modulation depth, and mixing each said modulated optical signal into a WDM optical signal, each said low frequency signal being a distinguishing identifier for each said WDM optical source;

a detection system coupled to said transmission system for detecting a portion of said WDM optical signal and obtaining first and second electrical signals carrying information on light intensity and wavelength respectively for each WDM optical source of said plurality of WDM optical sources; and a control system coupled between said transmission system and said detection system for analyzing said first and second electrical signals by Fourier transform and obtaining information on wavelength and light intensity for each said WDM optical source utilizing said distinguished identifier, and adjusting said wavelength and light intensity.

2. The multichannel WDM communication system of claim 1, wherein said transmission system comprises:

a plurality of data modulators connected respectively to said plurality of WDM optical sources for modulating each said WDM optical source by a respective electrical signal of low frequency and small modulation depth;

a low frequency generator coupled to said plurality of data modulators for generating a plurality of said distinguishing low frequency and small modulation depth electrical signals;

a variable optical attenuator unit for attenuating intensity of output signals of said data modulators;

a WDM multiplexer for combining output signals of said variable optical attenuators into said WDM optical signal; and a sample signal unit for diverting a sample signal, said sample signal derived from said WDM optical signal, said sample signal being divided into first and second sample signals for transmitting via respective first and second transmission paths.

3. The multichannel WDM communication system of claim 2, wherein said plurality of distinguishing low frequency electrical signals have frequencies ($f_1, f_2, \ldots f_n$) in a range of about 1 kHz to 4 kHz and providing a depth of modulation of said optical signals in a range of about 1% to 5%, wherein n is the number of WDM communication channels.

4. The multichannel WDM communication system of claim 3, wherein said sample signal unit further comprises:

an external tap coupler placed within said optical fiber for diverting about 1% of said WDM optical signal, and a splitter for dividing said sample signal into said first and second sample signals for directing them into said first and second transmission paths.

5. The multichannel WDM communication system of claim 4, wherein said detection system comprises:
   a first detector placed within said first transmission path for detecting and converting said first sample signal into a first electrical signal; and
   a wavelength locker and a second detector that are placed within said second transmission path for providing wavelength selectivity of said second sample signal and converting it into a second electrical signal.

6. The multichannel WDM transmission system of claim 5, wherein said control system comprises:
   an analyzer coupled to outputs of said first and second detectors for transforming said first and second electrical signals into Fourier components corresponding respectively to intensity and wavelengths of said WDM optical sources; and
   feedback connectors coupled between said analyzer and said WDM optical sources and said analyzer and said variable optical attenuators for providing digital feedback to wavelength and light intensity of each said WDM source respectively.

7. The multichannel WDM communication system of claim 1, wherein said transmission system comprises:
   a plurality of $LiNbO_3$ modulators connected respectively to said plurality of WDM optical sources for modulating each said WDM optical source by a respective electrical signal of low frequency and small modulation depth;
   a bias modulator control unit for generating a plurality of said distinguishing low frequency and small modulation depth electrical signals;
   a plurality of variable optical attenuators connected to said plurality of $LiNbO_3$ modulators respectively for attenuating the intensity of output signals of said $LiNbO_3$ modulators;
   a WDM multiplexer for combining output signals of said variable optical attenuators into said WDM optical signal; and
   a sample signal unit for diverting a sample signal, said sample signal derived from said WDM optical signal, said sample signal being divided into first and second sample signals for transmitting via respective first and second transmission paths.

8. The multichannel WDM communication system of claim 7, wherein each said $LiNbO_3$ modulator comprises a high frequency input for transmitting said optical signal of said WDM optical source and a low frequency input for applying said distinguishing electrical signal of low frequency and small modulation depth.

9. The multichannel WDM communication system of claim 8, wherein said plurality of distinguishing low frequency electrical signals have frequencies ($f_1, f_2, \ldots f_n$) in a range of about 1 kHz to 4 kHz that provide a depth of modulation of said optical signals in a range of about 1% to 5%, wherein n is a number of WDM communication channels.

10. The multichannel WDM communication system of claim 9, wherein each of said variable optical attenuators equalizes the intensity of each said optical signal generated by each said WDM optical source.

11. The multichannel WDM communication system of claim 10, wherein said sample signal unit further comprises:
    an external tap coupler placed within said optical fiber for diverting about 1% of said WDM optical signal, and
    a splitter for dividing said sample signal into said first and second sample signals for directing them into said first and second transmission paths.

12. The multichannel WDM communication system of claim 11, wherein said detection system comprises:
    a first detector placed within said first transmission path for detecting and converting said first sample signal into a first electrical signal; and
    a wavelength locker and a second detector that are placed within said second transmission path for providing wavelength selectivity of said second sample signal and converting it into a second electrical signal.

13. The multichannel WDM communication system of claim 12, wherein said control system comprises:
    an analyzer coupled to outputs of said first and second detectors for transforming said first and second electrical signals into Fourier components corresponding respectively to intensity and wavelengths of said WDM optical sources; and
    feedback connectors coupled between said analyzer and said WDM optical sources, said analyzer and said variable optical attenuators providing digital feedback on wavelength and light intensity of each said WDM source respectively.

14. A multichannel WDM communication system for propagating optical signals via optical fiber, comprising:
    a plurality of directly modulated diode lasers for generating optical signals within a respective plurality of communication channels;
    a generator of low frequency electrical signals coupled to said plurality of directly modulated diode lasers for generating a plurality of distinguishing electrical signals of low frequency and small modulation depth applied to low frequency inputs of a corresponding plurality of said directly modulated diode lasers, each said distinguishing low frequency electrical signal being an identifier for a respective directly modulated diode laser;
    a plurality of variable optical attenuators connected respectively to said plurality of directly modulated diode lasers for setting each said directly modulated diode laser to a predetermined optical power;
    a WDM multiplexer for mixing outputs of said directly modulated diode lasers into a WDM optical signal;
    a sample signal unit for diverting a sample portion of said WDM optical signal and dividing said sample portion about equally into first and second portions for transmitting them via first and second respective transmission paths; and
    a control unit comprising:
       a microprocessor for analyzing said first and second portions by converting them into first and second electrical signals respectively and for transforming said first and second electrical signals into Fourier components corresponding respectively to light intensity and wavelengths of said directly modulated diode lasers, the light intensity and wavelengths for each said directly modulated diode laser being obtained by utilizing said distinguishing identifier; and
       feedback connectors coupled between said microprocessor and said directly modulated diode lasers, and said microprocessor and said variable optical attenuators for providing a respective digital feedback for controlling wavelength and light intensity of each said WDM source.

15. The multichannel WDM communication system of claim 14, wherein said plurality of distinguishing low frequency electrical signals have frequencies ($f_1, f_2, \ldots f_n$) in a range of about 1 kHz to 4 kHz and provide said depth of modulation of said optical signals in a range of about 1% to 5%, where n is a number of WDM communication channels.

16. The multichannel WDM communication system of claim 15, wherein said sample signal unit further comprises an external tap coupler placed within said optical fiber for diverting about 1% of said WDM multiplexed signal into said transmission path, and a splitter for dividing said sample signal into said first and second portions.

17. The multichannel WDM communication system of claim 16, wherein said control unit further comprises;

a wavelength locker placed within said second transmission paths, said wavelength locker has selective elements for providing wavelength selectivity for said second portion of said sample; and a detector connected to said wavelength locker for converting said second portion of said sample into said second electrical signal.

18. A method for stabilizing wavelengths and light intensity of WDM optical sources of a multichannel WDM communication system, comprising the steps of:

modulating said WDM optical sources by distinguishing electrical signals of low frequency and small modulation depth for obtaining a unique optical output from each said WDM optical source;

setting a predetermined optical power for WDM optical sources by attenuating each output of said WDM optical sources by variable optical attenuators;

combining said modulated optical outputs by a WDM multiplexer for obtaining a WDM optical signal;

decoupling a sample signal, said sample signal froming a small portion of said WDM optical signal;

diverting said sample signal and transmitting two approximately equal portions of said sample signal via two respective transmission paths;

detecting one portion of said sample signal and converting thereof to a first electrical signal;

providing wavelength selectivity for another portion of said sample signal by a wavelength locker and detecting said another portion of said sample signal for converting thereof into a second electrical signal;

analyzing said first and second electrical signals by applying Fourier transform for obtaining a spectrum of respective light intensities and wavelengths of said WDM optical sources corresponding to the Fourier components; and identifying light intensity and wavelength of each said WDM optical source utilizing said unique optical output; and providing digital feedback to said variable optical attenuators and WDM optical sources for stabilization of intensities and wavelengths thereof.

19. The method for stabilizing wavelengths and light intensity of WDM optical sources of claim 18, further comprising the step of amplifying of said WDM optical signal by an optical amplifier.

20. The method for stabilizing wavelengths and intensity of WDM optical sources of claim 19, wherein the step of modulating said WDM optical sources further comprises modulating said WDM optical sources by electrical signals having frequencies ($f_1, f_2, \ldots f_n$) in a range of about 1 kHz to 4 kHz, and depth of modulations in a range of about 1% to 5%.

21. The method for stabilizing light intensity and wavelengths of WDM optical sources of claim 20, wherein said modulation frequencies of electrical signals exceed the inverse response time of said optical amplifier.

22. The method for stabilizing wavelengths and light intensity of WDM optical sources of claim 21, wherein said modulating frequencies are lower than the frequency components of data modulation.

23. The method for stabilizing wavelengths and light intensity of WDM optical sources of claim 22, wherein the step of analyzing said second electrical signal further comprises the step of obtaining the amplitude of the Fourier component given by $$|F(f_i)| = \eta <P_{i0}> m/2;$$

where $P_{i0}$ is the average power of an individual WDM optical source, $f_i$ and m are respectively the modulating frequency and the depth of modulation of said individual WDM optical source.

24. The method for stabilizing wavelengths and light intensity of WDM optical sources of claim 23, wherein the step of analyzing said first electrical signal further comprises the step of obtaining the spectrum of said first electrical signal having said frequencies ($f_1, f_2, \ldots f_n$).

* * * * *